UNITED STATES PATENT OFFICE.

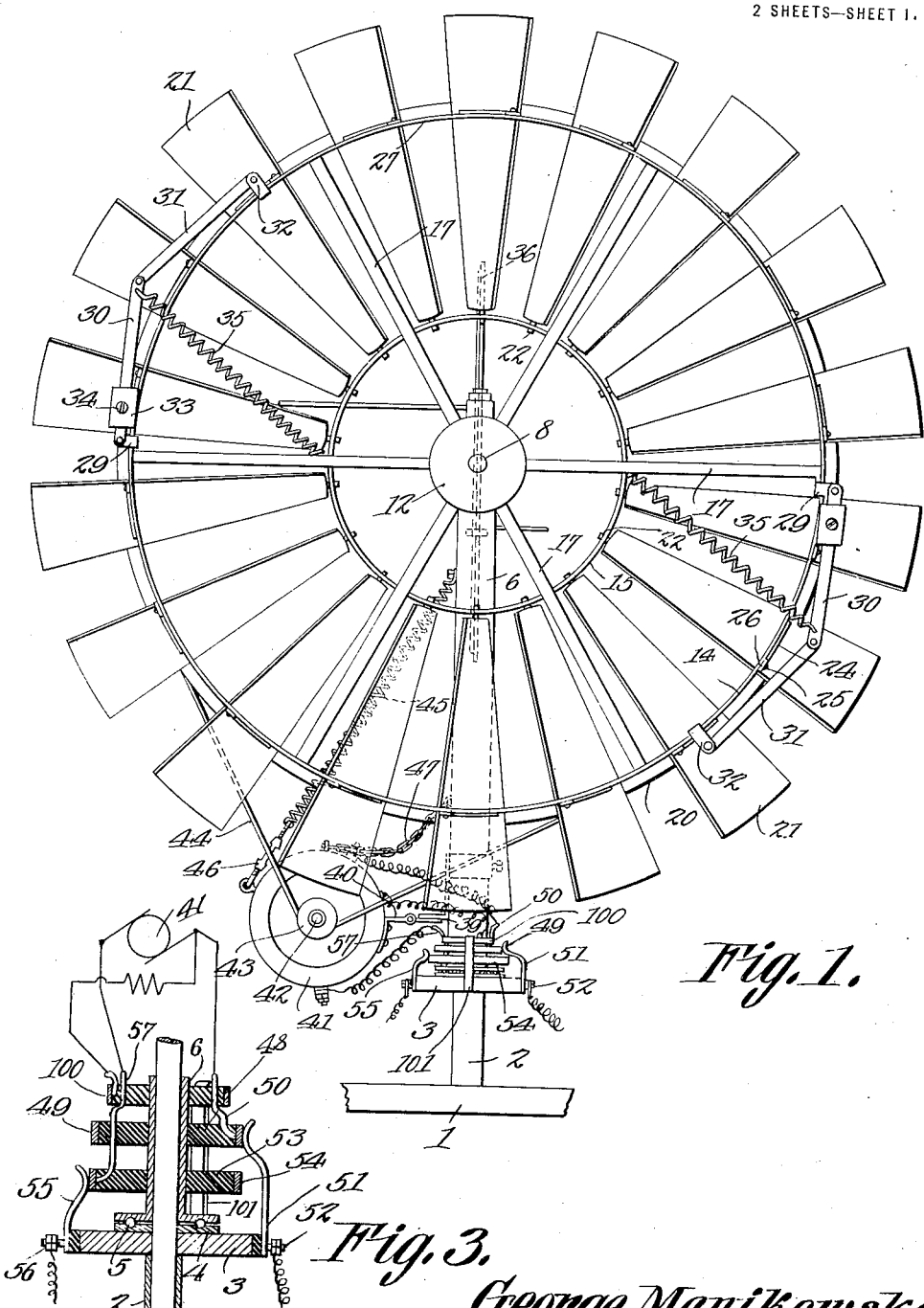

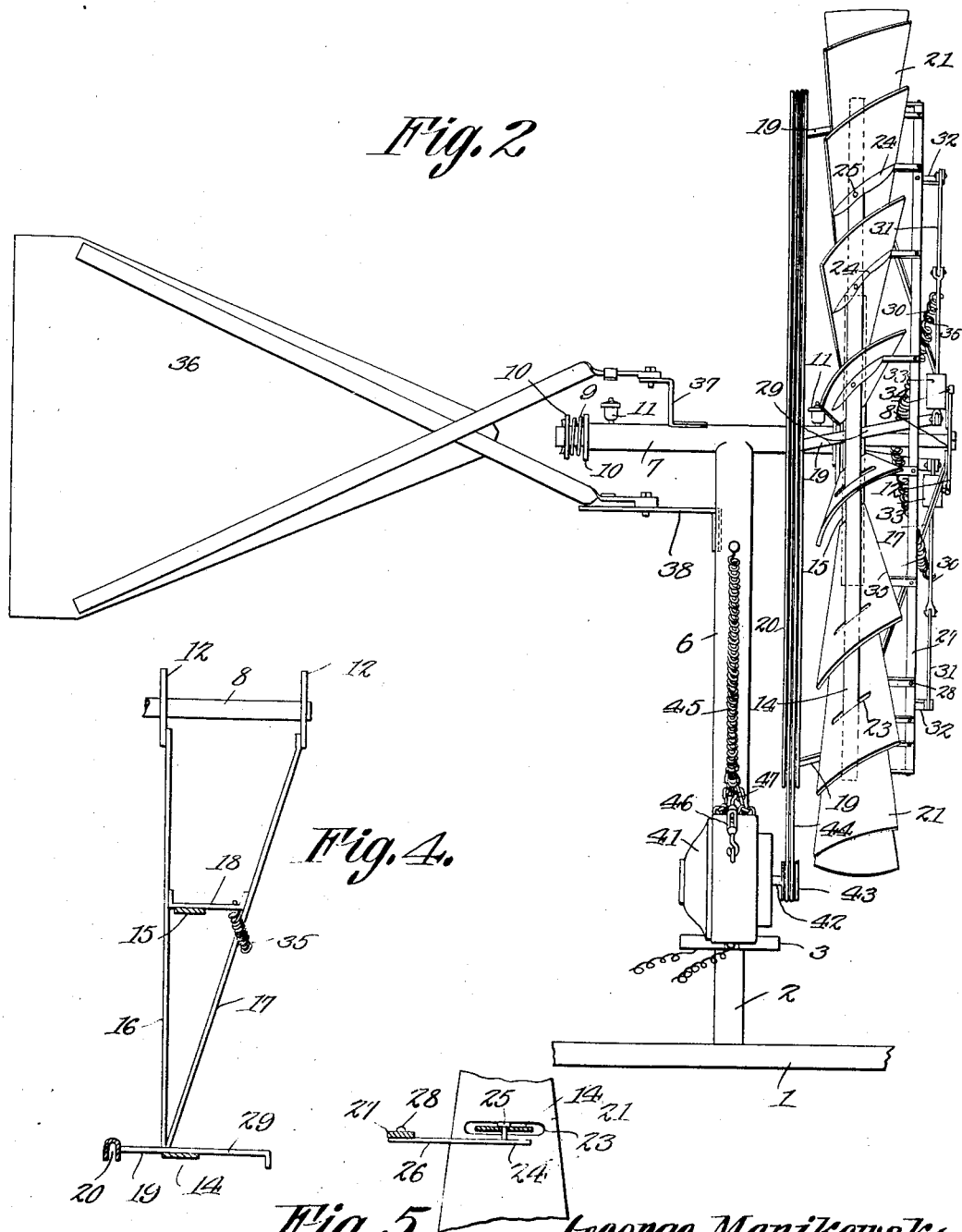

GEORGE MANIKOWSKE, OF MOORETON, NORTH DAKOTA.

ELECTRIC LIGHTING AND POWER WINDMILL.

1,183,219.  Specification of Letters Patent.  Patented May 16, 1916.

Application filed May 20, 1914. Serial No. 839,828.

*To all whom it may concern:*

Be it known that I, GEORGE MANIKOWSKE, a citizen of the United States, residing at Mooreton, in the county of Richland and State of North Dakota, have invented a new and useful Electric Lighting and Power Windmill, of which the following is a specification.

The device forming the subject matter of this application is a windmill adapted to be employed in connection with a dynamo for generating electric current, and the invention aims, primarily, to provide novel means for operatively connecting the dynamo with the wind wheel.

Another object of the invention is to improve a governor mechanism whereby the blades of the wind wheel are shifted.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 shows the invention in front elevation; Fig. 2 is a side elevation; Fig. 3 is a diagrammatic sectional detail of the lower portion of the supporting structure on which the wind wheel is journaled; Fig. 4 is a fragmental transverse section illustrating certain structural details of the wind wheel; Fig. 5 is a fragmental transverse section showing certain details connected with the blades of the wind-wheel.

In the accompanying drawings there is shown a base 1 and fixed to and upstanding from the base 1 is a post 2. The post 2 carries adjacent its lower end as shown best in Fig. 3, a platform 3 provided with a thrust bearing 4 coöperating with a thrust bearing 5 on the lower end of a tube 6 which is journaled on the post 2. Connected with the upper end of the tube 6 is a tubular transverse head 7. The tube 6 and its head 7 may be denominated a supporting structure which is journaled for rotation on the post 2.

Mounted to rotate in the tubular transverse head 7 is a shaft 8, constituting a part of a wind wheel, there being a compression spring 9 which surrounds the rear, protruding end of the shaft 8, the spring 9 abutting against collars 10, one of which collars abuts against the end of the tubular head 7, the other of which is fixed upon the shaft 8 against longitudinal movement thereon. Obviously, the spring 9 and the collars 10 coöperate to hold the shaft 8 yieldingly in the head 7 of the supporting structure for rotation therein. At any point in its length, the tubular head 7 may be equipped with an oil cup 11 whereby the shaft 8 may be lubricated.

The wind wheel proper may be of any desired form but in the present instance, as will be understood best from Fig. 4, hub plates 12 are secured to the shaft 8 and from the hub plates 12 radiate spokes 16 and 17, the outer ends of the spokes 16 and 17 being connected with an outer rim 14. The spokes 16 and 17 are connected by braces 18 and supporting an inner rim 15. Arms 19 project laterally from the outer rim 14 and support a grooved driving rim 20.

The blades of the wind wheel are denoted by the numeral 21 and are equipped at their inner ends with stub shafts 22 which are journaled in the inner rim 15, as shown at best advantage in Fig. 1. The blades 21 are provided with slots 23 through which the outer rim 14 passes. Projecting from the blades 21 adjacent the slots 23 are ribs 24. Mounted in the ribs 24 and in the outer rim 14 are pivot elements 25. The outer rim 14 and the inner rim 15 may be described as a relatively fixed frame upon which the blades 21 are journaled. The ribs 24 on the blades 21 are terminally prolonged to form arms 26 connected with a lateral ring 27 through the instrumentality of pivot elements 28. This lateral ring 27 may be alluded to as a relatively movable frame, the construction, obviously, being such that the lateral ring 27 and the outer rim 14 may have relative circumferential movement with respect to each other, to rotate the blades 21 upon their axes and thus vary the pitch of the blades with respect to the wind.

Certain of the arms 19 are prolonged to form arms 29 as will be understood from Fig. 4. To the arms 29 are pivoted links 30, the inner end of each link 30 being pivoted to the inner end of a link 31 pivotally connected with a lug 32 formed upon the lateral ring 27. Upon the link 30 is adjustably mounted a weight 33 held in adjusted positions by a set screw 34. Retractile springs 35 are provided, the spring 35 being connected, each, at one end to the link 30, the other end of each spring being connected to the lateral brace 18.

The invention includes, as clearly shown in Fig. 2, a vane 36, the function of which is clearly understood. This vane 36 may be of any desired form and may be mounted in any preferred manner. Preferably, it is pivoted to a bracket 37 mounted on the head 7, and to a bracket 38 mounted on the tube 6.

Attached to the tube 6 adjacent its lower end is a vertical adjustable hanger 39 to which is secured hinge 40, connected with a cased dynamo 41 the armature shaft of which is shown at 42, the shaft 42 carrying a pulley 43. A belt 44 is trained around the pulley 43 and around the driving rim 20 of the wind wheel. A retractile spring or its equivalent is provided, and when the spring, denoted by the numeral 45 is employed, one end of the spring is connected with the tube 6 and the other end of the spring is connected with the dynamo 41. Any desired means may be employed for adjusting the tension of the spring 44. If desired, a turn buckle 46 may be employed in connecting the lower end of the spring 45 with the dynamo 41. A slack chain 47 or other flexible element is connected with the tube 6 and with the dynamo 41.

Noting Fig. 3 and comparing the same with Fig. 1 it will be observed that a disk 48 made of insulating material is secured to the tube 6 adjacent the lower end of the tube. This insulating disk 48 is surrounded peripherally by a tread 49 of conducting material. A conductor 50 passes into the disk 48 and is connected with the tread 49, the conductor 50 leading to the dynamo. The conducting tread 49 is adapted to be engaged by a yieldable brush 51 attached to the platform 3 and provided with any suitable means, such as a binding post 52, whereby the brush 51 may be brought into an electrical circuit. Secured to the tube 6 and below the insulating disk 48 is an insulating disk 53 having a peripheral tread 54 made of conducting material. The tread 54 is engaged by a brush 55 secured to the platform 3 and provided with a binding post 56 or the like whereby the brush 55 may be brought into an electrical circuit. A conductor 57 passes downwardly through the disk 48 and into the disk 53 and is electrically connected with the conducting tread 54 of the disk 53. A third disk 100 and a brush 101 may be provided for strengthening the field current thus rendering it unnecessary for the operator to ascend the wheel as is the case when the dynamo is in elevated position.

So far as the governor mechanism for controlling the action of the wind wheel is concerned, it will be understood that when the windwheel rotates, the links 30 and 31 will tend to fold outwardly, due to the centrifugal action of the weight 33. By this operation, the lateral ring 27 will be rotated with respect to the outer rim 14 and the blades 21 will be rotated on their axes, thus disposing the blades at a more or less pronounced angle with respect to the wind. In this manner, the effective area of the blades may be reduced or diminished automatically.

When the wind wheel and the supporting structure involving the tube 6 and its head 7 rotates upon the post 2, the dynamo 41 will be carried around along with the tube 6. Owing to the fact that the dynamo 41 is connected with the tube 6 by means of the hinge 40, the dynamo tends to act as a belt tightener. The function of the spring 45 is to resist an excessive strain on the belt 44 due to the weight of the dynamo 41 and it is to be observed that the tensile effect of the spring 45 may be varied by manipulating the turn buckle 46 or by operating any mechanical equivalent used in the place of the turn buckle. The function of the slack chain 47 is to support the dynamo 41 should the spring 45 break or should both the spring and the belt 44 break.

Passing to Fig. 3 it will be understood readily that the dynamo circuit includes, upon one side, the brush 55, the conducting tread 54 and the conductor 57. Upon the other side, the circuit of the dynamo includes the brush 51, the conducting tread 49, and the conductor 50. The construction, as will be understood readily by those skilled in the art, is such that when the tube 6 rotates, due to a shift in the direction of the wind, the electrical circuit will not be broken, because the brushes 55 and 51 bear respectively upon the conducting treads 54 and 49.

It is to be observed that the generator 41 is driven directly from the wind wheel, through the instrumentality of a belt which is operatively connected with a sheave or pulley mounted directly on the wind wheel near the periphery of the wind wheel. Owing to this construction, beveled pinions and other gear elements of a like sort are dispensed with, such structures as is well known, being noisy in operation and resulting in a loss of efficiency. The device is so constructed that but three main operative parts are necessary, to wit, the wind wheel, the generator and the belt. Further, the construction under consideration allows the transverse head 7 to be relatively long and thus the bearing area which supports the shaft 8 for rotation is increased. Owing to the fact that the driving rim 20 constitutes a part of the wind wheel proper, this driving rim may be located in a circle passing through the centers of effort of blades 21. The driving force, therefore, is transmitted into the rim 20 in an efficient and satisfactory manner. Since the dynamo 41 is yieldably supported, the same acts as a belt tightener and all auxiliary elements commonly necessary to tighten the belt are dispensed with.

Having thus described the invention, what is claimed is:—

1. In a device of the class described, a supporting structure; means for upholding the supporting structure for rotation; a wind wheel journaled on the supporting structure; a pulley operatively connected with the wind wheel; a dynamo hinged to the supporting structure; a belt operatively connecting the dynamo with the pulley; spring means coacting with the belt for supporting the dynamo; and mechanism for adjusting the spring means.

2. In a device of the class described, a supporting structure; a wind wheel journaled on the supporting structure; a pulley operatively connected with the wind wheel; a dynamo movably connected with the supporting structure; a belt forming an operative connection between the dynamo and the pulley; yieldable means coacting with the belt for supporting the dynamo; mechanism for adjusting the yieldable means; a flexible element connected with the dynamo; and means for securing the flexible element to enable the same to support the dynamo when the yieldable means is strained beyond a predetermined point.

In testimony that I claim the foregoing as my own, I have hereto affixed my signature in the presence of two witnesses.

GEORGE MANIKOWSKE.

Witnesses:
AUGUST BERGMAN,
C. D. CLIPFELL.